United States Patent [19]

Spurlock

[11] Patent Number: 5,664,139

[45] Date of Patent: Sep. 2, 1997

[54] METHOD AND A COMPUTER SYSTEM FOR ALLOCATING AND MAPPING FRAME BUFFERS INTO EXPANDED MEMORY

[75] Inventor: Randolph W. Spurlock, Tomball, Tex.

[73] Assignee: Compaq Computer Corporation, Houston, Tex.

[21] Appl. No.: 243,364

[22] Filed: May 16, 1994

[51] Int. Cl.$^6$ .............................. G06F 9/26; G06F 9/32; G06F 12/00; G06F 12/02
[52] U.S. Cl. .................... 711/202; 395/326; 711/203; 711/206; 711/207; 711/163; 711/209
[58] Field of Search .................. 395/412, 413, 395/416, 417, 490, 164, 700; 382/8

[56] References Cited

U.S. PATENT DOCUMENTS

| | | | |
|---|---|---|---|
| 4,817,184 | 3/1989 | Thomason et al. | 382/8 |
| 5,119,494 | 6/1992 | Garman | 395/700 |
| 5,245,702 | 9/1993 | McIntyre et al. | 395/154 |
| 5,367,658 | 11/1994 | Spear et al. | 395/490 |

OTHER PUBLICATIONS

Kennedy, Randall. "QEMM 386 6.02", Windows Sources. v1 n7 p256 Aug. 1993.
Gookin, Dan. "QEMM-386 vs. 386Max". PC-Computing. v6 n4 p228 Apr. 1993.

*Primary Examiner*—David K. Moore
*Assistant Examiner*—Than V. Nguyen
*Attorney, Agent, or Firm*—Vinson & Elkins L.L.P.

[57] ABSTRACT

A video driver in a computer system is used to map a large video frame buffer into the logical address space above physical memory while the computer system is operating in WINDOWS STANDARD mode. The requirements of the necessary address space for the frame buffer (i.e., the size of the frame buffer), and the size of physical memory are determined. If there is sufficient address space above physical memory in which to map the frame buffer, the video driver attempts to map the frame buffer there in that address space. The desired physical and linear addresses for the frame buffer are determined. If the video driver detects that MICROSOFT WINDOWS is operating in standard mode, it searches memory to find the page directory that MICROSOFT WINDOWS created. Once the page directory is found, the driver creates a new page table to map the frame buffer into the desired linear address range and adds a new entry to the existing page directory to point to the new page table.

56 Claims, 4 Drawing Sheets

METHOD AND A COMPUTER SYSTEM FOR ALLOCATING AND MAPPING FRAME BUFFERS INTO EXPANDED MEMORY

TECHNICAL FIELD OF THE INVENTION

This invention relates in general to computer systems, and more particularly to a method of allocating high memory to a video frame buffer.

BACKGROUND OF THE INVENTION

The speed at which a personal computer operates is dependent upon a number of factors. Naturally, the speed of the microprocessor has a significant influence on the speed of operation of the overall computer system. Next to processor speed, in many cases, the video graphics subsystem has the most influence on the performance of the overall computer system. This is particularly true when a graphical user interface, such as MICROSOFT WINDOWS (by Microsoft Corporation of Redmond, Wash.) is used. In order to boost performance, most modern day personal computers use either a local video bus and an accelerated video card. A local video bus has a higher data bandwidth than the main peripheral bus, thus increasing the speed of bus operations associated with video. An accelerated video card allows the video card to perform selected video operations at high speed, rather than using the CPU to perform the operation. These two components accelerate the operation of the computer system in two ways: (1) the CPU no longer needs to perform low-level operations handled by the video card and (2) the data bandwidth for certain operations is greatly reduced, resulting in higher thru-put.

Whereas early video systems allocated a 128K memory buffer in the address space between 640K and 1M, present day memory controllers use a much larger frame buffer to accommodate higher resolutions and greater color depths. Resolutions from 640×480 pixels to 1280×1024 pixels are common on consumer machines. Further, color depths range from 16 colors (each color represented by a four bit nibble) to 16.7M colors (each color represented by a 24/32 bits). While normal video controllers usually do not support the highest color depth at the highest resolution, it is not uncommon for a controller to support the highest resolution at 256 colors or the highest color depth at 800×600 pixels. Thus, it is not uncommon for modern day video controllers to have a 2M frame buffer to accommodate these modes of operation. Many cards are configurable to multiple frame buffer sizes, typically 512K, 1M and 2M; the smaller frame buffer sizes will not provide the user with the full range of operating modes.

With larger frame buffer sizes, the address space of the frame buffer cannot be accommodated in the range from 640K to 1M. In an attempt to address this problem, many video controller cards use a 64k buffer in the 640K to 1M address space as a window to the larger video frame buffer. The problem with this approach is that it requires an indirect method of addressing the frame buffer according to a "banking" scheme. Such a banking scheme increases the complexity of addressing and slows the operation of the video subsystem. Consequently, it is desirable to allocate a portion of the computer system's memory address space to the large video frame buffer so that the frame buffer can be addressed directly without banking.

In MICROSOFT WINDOWS enhanced mode, allocating the memory address space in this manner is relatively simple. This is because in WINDOWS enhanced mode memory management services are provided by a built-in DOS Protected Mode Interface ("DPMI") memory manager. A physical address space can be requested by making a call to DPMI. In response to the request, DPMI returns a linear address (which may differ from the physical address) for addressing the requested address space. DPMI manages the page directories and page tables to properly allocate the requested address space.

In MICROSOFT WINDOWS standard mode, however, the allocation is more complicated because of the MICROSOFT WINDOWS initialization routine. During its initialization in standard mode, MICROSOFT WINDOWS uses a third-party memory manager, if present, to create the page directory entries and page tables that are necessary to access the address space using the paged addressing capabilities of INTEL 80386 and 80486 or equivalent (hereinafter '386 and '486 class) microprocessors. Typical third-party memory managers used for this purpose are QEMM by Quarterdeck Office Systems of Santa Monica, Calif. and 386MAX by Qualitas of Bethesda, Md. One problem with these memory managers is that, in order to minimize the amount of memory taken up by page directory entries and page tables, they build only enough page directory entries and page tables to access populated locations in the memory address space (the computer system's physically installed main memory). Thus, for a computer system with a 4M memory, these memory managers will only build the page tables and page directories through a 4M address space. If the frame buffer were addressed through the 4M-6M address space, for example, an addressing error would occur. It should be noted that MICROSOFT WINDOWS will build page tables for the entire address space (up to 16M for an Industry Standard Architecture or "ISA" bus system) in standard mode if no third-party memory manager is executing when WINDOWS is loaded.

MICROSOFT WINDOWS standard mode is used in several common circumstances: either because of hardware constraints such as the amount of system memory, because of better performance with certain hardware configurations (such as a machine with 2M of system memory), or because an application program written for an earlier version of WINDOWS will not run in WINDOWS 3.1 enhanced mode. Consequently, it is important to provide direct addressing of the frame buffer for WINDOWS standard mode in order to provide high speed video operations under those circumstances.

Therefore, a need has arisen in the industry for a method and apparatus for direct addressing of a video frame buffer in WINDOWS standard mode in an address space above that of physical memory.

SUMMARY OF THE INVENTION

The present invention overcomes problems with directly addressing a frame buffer under circumstances in which the operating system has failed to create sufficient page directory entries and page tables needed to directly address the frame buffer. The requirements of the necessary address space for the frame buffer (i.e., the size of the frame buffer), and the size of physical memory are determined. If there is sufficient address space above physical memory in which to map the frame buffer, the video driver attempts to map the frame buffer in that address space. The desired physical and linear addresses for the frame buffer are determined. In one embodiment, if the video driver detects that MICROSOFT WINDOWS is operating in standard mode, it searches memory to find the page directory that MICROSOFT WINDOWS is using. Once the page directory is found, the driver creates a new page table to map the frame buffer into the desired linear address range and adds a new entry to the existing page directory to point to the new page table.

The present invention provides significant advantages over the prior art. Direct addressing of a frame buffer is made possible regardless of whether the operating system has created the page directory entries and page tables necessary to access the memory space required by the frame buffer. Thus, direct addressing of the frame buffer is made possible in MICROSOFT WINDOWS standard mode, enhancing the speed of the video system for computers operating in that mode.

DETAILED DESCRIPTION OF THE INVENTION

Figure 1:
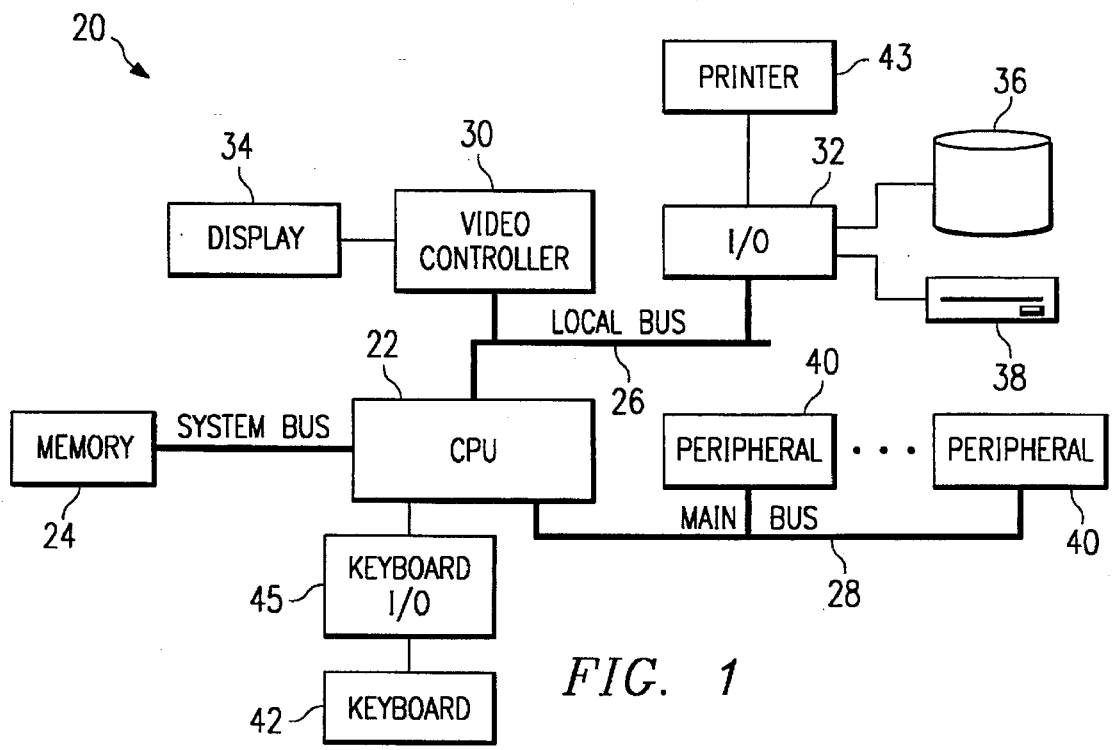
FIG. 1 is a block diagram illustrating an exemplary embodiment of a prior art high-performance personal computer system.

FIG. 1 illustrates a block diagram of a computer system 20. The computer system 20 includes a microprocessor (or central processing unit) 22, coupled to a memory 24, a local bus 26 and a main peripheral bus 28. A video controller 30 and I/O circuitry 32 are coupled to the local bus 26. A display 34 is coupled to the video controller 30. A hard disk 36 and floppy disk 38 are coupled to the I/O circuitry 32. A plurality of peripherals 40 are coupled to the main bus 28. A keyboard is coupled to CPU 22 through keyboard interface 45. A printer 43 is also coupled to I/O circuitry 32. The computer system 20 of FIG. 1 is an exemplary embodiment for a high performance computer system. Many computer systems vary from the architecture shown in FIG. 1, and the invention described herein would apply to various architectures. Further, the architecture shown in FIG. 1 is a basic architecture and many of the details have been removed for illustrative purposes.

Figure 2:
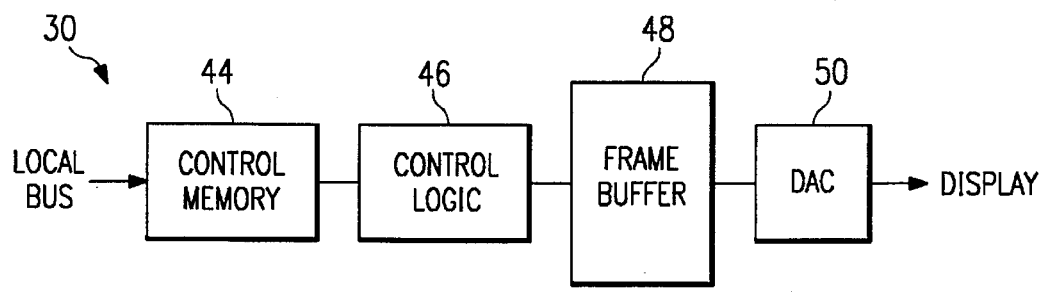
FIG. 2 is a block diagram illustrating a general block diagram of a video controller which could be used in the computer system of FIG. 1.

FIG. 2 illustrates a more detailed block diagram of the video controller 30. The video controller 30 comprises a memory section 44, including control registers and buffers, a state machine 46 coupled to the memory section 44 and a frame buffer 48. The frame buffer 48 is connected to a digital-to-analog converter (DAC) 50 which outputs video information to the display 34 responsive to the data stored in frame buffer.

The video driver is loaded at runtime along with the WINDOWS operating environment. In operation, the video driver, responsive to instructions from the operating environment, outputs data and control signals to the video controller 30. Responsive to the data and control signals, the state machine 46 controls the flow of data to and from the frame buffer 48 in order to control the images appearing on the monitor screen.

Figure 3:
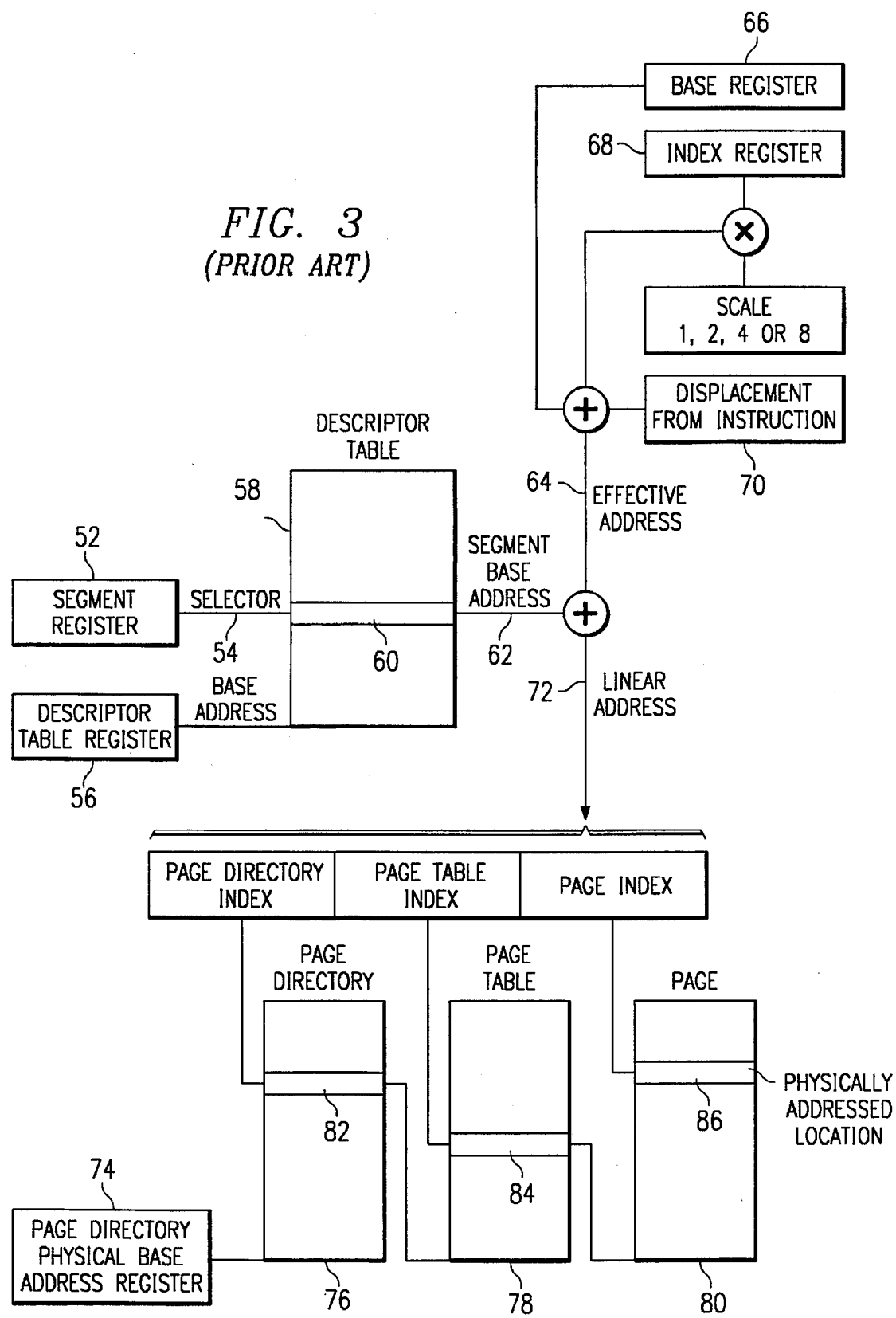
FIG. 3 is a block diagram illustrating the prior art addressing mechanism of INTEL 80386 and 80486 microprocessors operating in paged protected mode.

FIG. 3 illustrates the addressing mechanism of 386/486 class microprocessors operating in paged protected mode. Segment register 52 contains selector 54. Descriptor table register 56 holds the base address of descriptor table 58. The upper thirteen bits of selector 54 are used as an offset within descriptor table 58 to select one of the entries 60 in descriptor table 58. Descriptor table 58 is an operating system-defined table stored in memory. Descriptor table 58 may be as long as 64k bytes and may contain as many as 8,192 8-byte segment descriptors. Segment base address 62 is taken from the descriptor table entry 60 so selected. Effective address 64 is formed by adding the contents of base register 66 with the scaled contents of index register 68, and then modifying the sum according to the displacement 70 that is found in the instruction. Finally, segment base address 62 is added to effective address 64 to produce linear address 72.

In non-paged protected mode, the physical address is the same as linear address 72. In paged protected mode, however, linear address 72 is translated according to the following scheme: The address space of the computer system is viewed as a series of pages, each page being 4k bytes long. Two levels of operating system-defined look-up tables are stored in memory. The first level of tables comprises the "page directory." The second level of tables comprises a set of "page tables." Page directory physical base address register 74 holds the base address of page directory 76. In turn, the entries in page directory 76 hold the base addresses of various page tables, such as page table 78. Each page table holds the high-order bits of the physical base addresses for certain pages in the address space of the computer system, such as page 80. In paged protected operation, the paging unit of the microprocessor interprets the upper ten bits of linear address 72 as an index to select one of the page directory entries 82; it interprets the middle ten bits of linear address 72 as an index to select one of the page table entries 84; and it interprets the lower twelve bits of linear address 72 as an index to select one address location 86 within the selected page 80. (To accomplish this, the paging unit concatenates the lower twelve bits of linear address 72 with the contents of the selected page table entry 84 to produce the physical address of location 86.)

Figure 4:
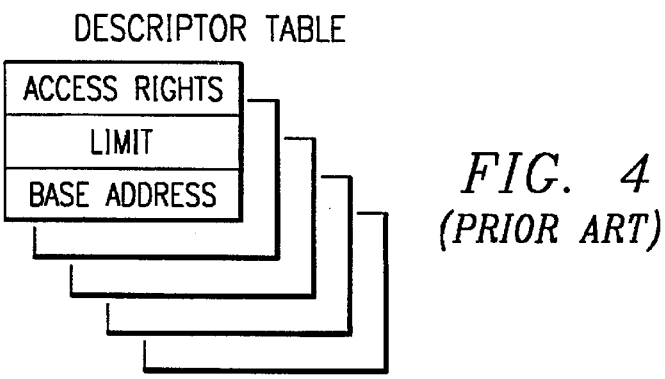
FIG. 4 illustrates, in simplified form, fields in the prior art descriptor table of FIG. 3.

FIG. 4 illustrates the format of the entries in descriptor table 58. The base address value represents the base address of a segment of memory space. The limit value represents the length of the segment pointed to by the base address. The access rights value contains information used by the system in controlling access to and maintenance of the segment pointed to by the base address.

Figure 5:
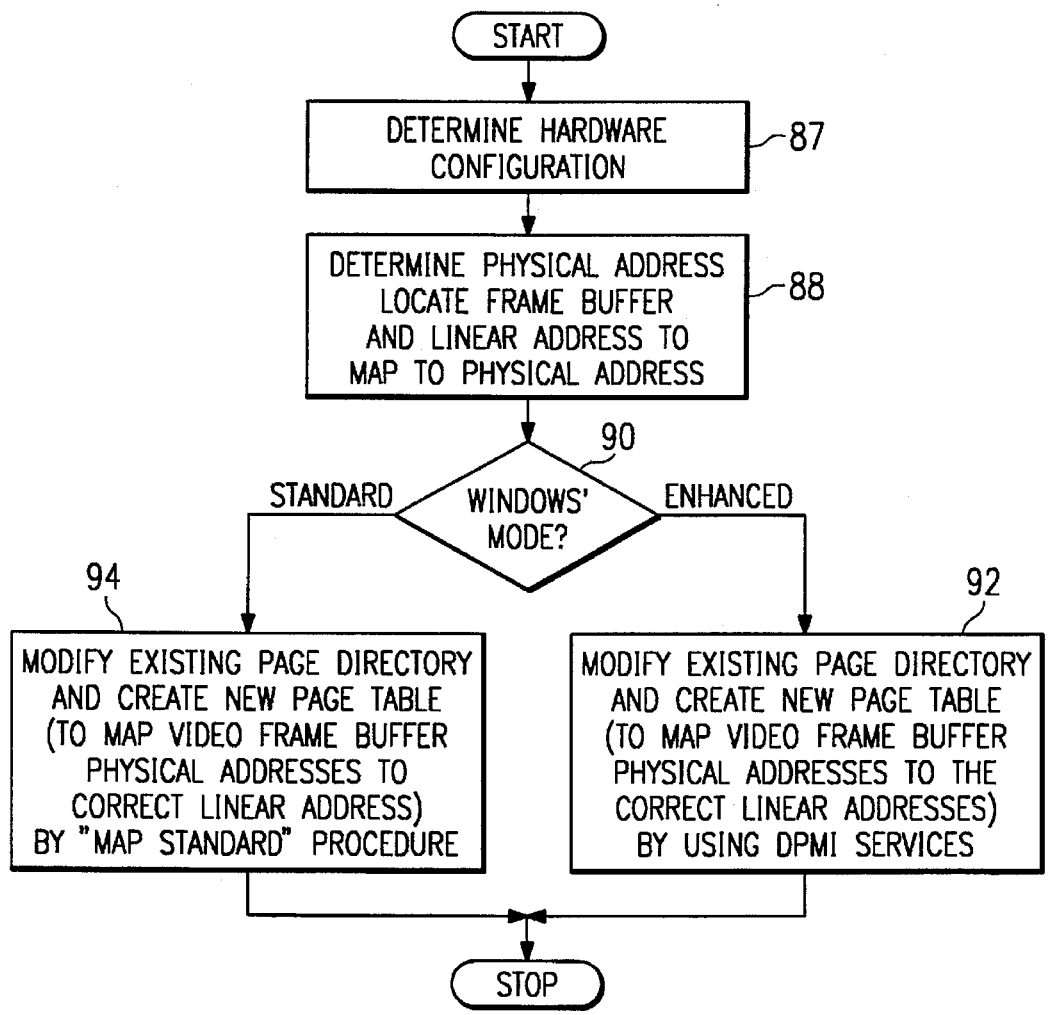
FIG. 5 is a flow diagram illustrating the allocation of high memory in a personal computer system according to a preferred embodiment of the present invention.
Figure 6:
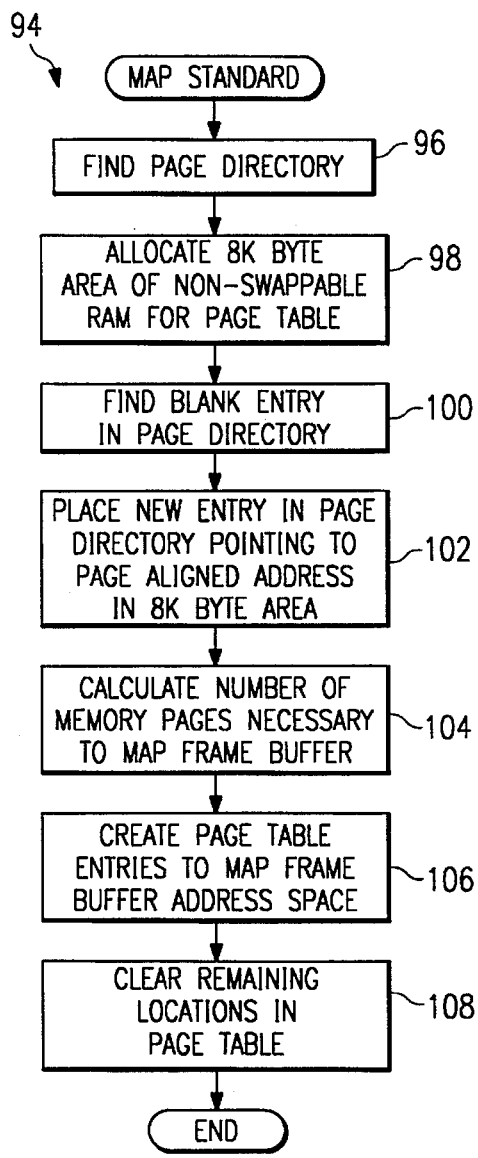
FIG. 6 is a flow diagram illustrating the portion of the diagram of FIG. 5 called the MAP STANDARD procedure.
Figure 7:
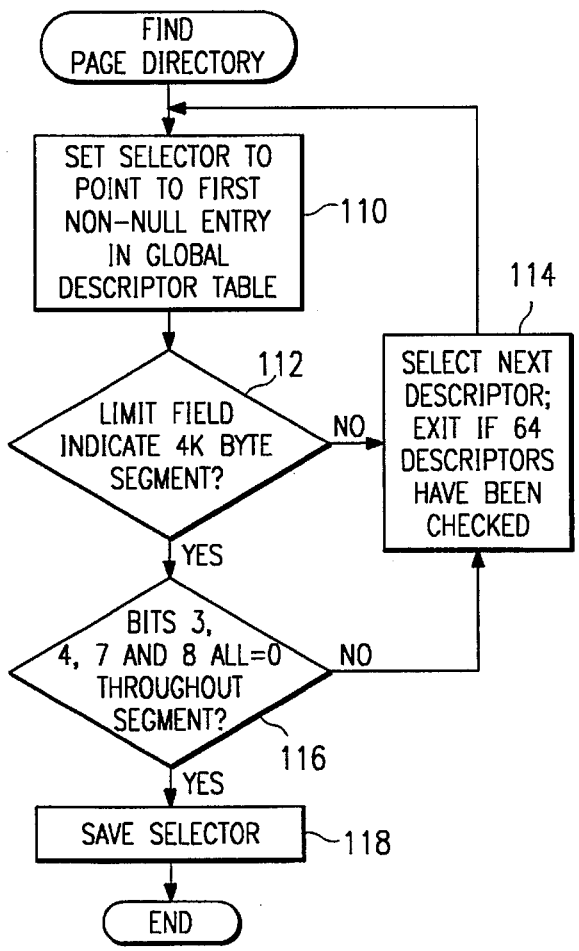
FIG. 7 is a flow diagram illustrating the portion of the diagram of FIG. 6 called the FIND PAGE DIRECTORY procedure.

One preferred embodiment of the present invention is to use the video display driver software to allocate high memory to frame buffer 48. FIGS. 5-7 are flow diagrams illustrating a preferred embodiment of such a video display driver. Referring now to FIG. 5, step 87 is assumed to occur after WINDOWS has done its own initialization and has built a page directory and certain page tables in memory 24 or is using page tables created by a separate memory management program. Step 87 determines the hardware factors which are necessary to place the frame buffer in high memory, such as the amount of physical memory present in the computer system, the size of the frame buffer (e.g., 512k, 1M or 2M), and optionally, whether there are any other contentions for the address space located between 16M and the highest physical memory address. The size of the frame buffer can be obtained from the video controller 30, and the physical memory range can be obtained from CMOS which stores the ROM BIOS configuration data. In step 88, the video driver software determines which physical addresses video controller 30 will be decoding for frame buffer 48, and also to which linear addresses these physical addresses should correspond. Preferably, the linear addresses (which can be up to 4M and mapped by the page tables to a physical address in the address space between the top of physical memory and 16M) chosen should be high, so as to avoid accidental conflicts with other software or devices that may use high linear addresses in the memory address space. Also, the lowest physical address decoded by video controller 30 for frame buffer 48 should preferably be just above the highest address of physically installed memory, while the highest decoded address is below the physical address limits of computer system 20. The driver of FIG. 5 assumes that WINDOWS is operating in connection with a memory management program and, as a result, only enough page directory entries and page tables have been created to access the RAM memory that is physically installed in the system. In other words, the driver assumes that page tables do not exist for accessing memory addresses above physically installed memory.

In step 90, the driver software determines whether WIN- DOWS is operating in standard or enhanced mode, such information which is available from WINDOWS. If the driver determines that WINDOWS is operating in enhanced mode, then it assumes that DPMI services will be available. In that instance, the driver makes calls to the DPMI services in step 92 in order to have the new page table created if necessary (the created page table will allow access to the physical addresses of frame buffer 48 via the returned linear addresses) and to modify the existing page directory so that it contains a pointer to the new page table. DPMI will return a linear base address for the frame buffer. On the other hand, if the driver detects that WINDOWS is operating in standard mode, then it performs the necessary page directory modification and page table creation operations independently from WINDOWS in step 94 without the assistance of DPMI services, since DPMI is unavailable in WINDOWS standard mode. In order for the driver to perform those functions independently, the driver executes the MAP STANDARD procedure described below.

FIG. 6 is a flow diagram illustrating the MAP STANDARD procedure. In step 96, the driver executes a procedure called FIND PAGE DIRECTORY in order to locate the memory segment that the operating system has already designated as the page directory. The FIND PAGE DIRECTORY procedure will be discussed in more detail below in connection with FIG. 7. After the page directory is found, the driver uses the DOS allocate feature in step 98 to allocate an 8k byte area of fixed memory for use in creating the new page table. While only 4k bytes are required to create a complete page table, the starting address of a page table must be a page-aligned address. The DOS allocate feature does not guarantee that the allocated area begins at a page-aligned address. Thus, 8k bytes are requested from DOS allocate so that at least one contiguous 4k byte page will certainly be within the allocated area. The driver then uses the lowest page-aligned address within the allocated area to serve as the base address of the page table to be created.

Once the base address of the new page table is known, the driver proceeds to step 100. There, the driver loops through the page directory until it finds the first all-zero entry. The driver creates a new page directory entry there in step 102 to point to the new page table that has been allocated, and which is to be created.

In steps 104 and 106, the driver calculates the number of pages that will be required to map frame buffer 48 into the memory address space, and places one entry in the new page table for each required page of memory address space. Each such page table entry should contain the physical address of a page within frame buffer 48. Unused space in the new page table is cleared in step 108 by setting all unused locations in the 4k byte page table to zero in step 108.

FIG. 7 is a flow diagram illustrating the FIND PAGE DIRECTORY procedure. By this procedure the driver locates, in system memory, the page directory that was created by the operating system and/or memory management program. In step 110, a selector is used to point to the first non-null entry in the global descriptor table. Then, in steps 112 and 114, the descriptors in the table are checked sequentially until one is found that corresponds to a 4k byte segment (or until 64 descriptors have been checked, in which case the FIND PAGE DIRECTORY procedure returns an error).

Assuming a descriptor is found that corresponds to a 4k byte segment, the driver checks to see whether the 4k byte segment in question may be the page directory. It does so in step 116 by checking bits 3, 4, 7 and 8 in all 1,024 double words located within the segment. If the segment were actually the page directory, then all of these bits would be set to zero, because these bits are defined by the industry to be zero in all page directory entries. If any of the bits are non-zero, the driver assumes that the 4k byte segment is not the page directory, and it continues stepping through the global descriptor table as described in steps 114 and 112. On the other hand, if all of the checked bits were zero, then the driver assumes that it has found the page directory and, in step 118, saves the selector to indicate where in the global descriptor table the pointer to the page directory is located.

Initialization of the video display driver in the above-described manner provides significant advantages over the prior art because it enables a large video frame buffer to be mapped above physically installed memory even when WINDOWS is operating in standard mode. While prior art systems relied on banking techniques to access large video frame buffers in WINDOWS standard mode, yielding slower video performance, the method of the present invention enables direct access to one large and continuous frame buffer in WINDOWS standard mode, thus enhancing the speed of the video system.

Although the invention has been described above with reference to specific embodiments, this specification will suggest modifications and other alternative and equivalent embodiments to persons having ordinary skill in the art, which modifications and alternative embodiments will remain within the spirit and scope of the appended claims. While the invention has been discussed in relation to WINDOWS standard mode, other situations in which limited page tables are created by a memory management program may be addressed by the present invention to allow unmapped physical address space to be used by a device.

What is claimed is:

1. A method of allocating memory address space in a computer system to a frame buffer comprising the steps of:

determining a desired memory space for the frame buffer responsive to the physical memory and the address limitations of the computer system;

detecting the presence of a page directory that defines the upper limit of the computer system's memory address space to be below the desired address space for locating the frame buffer, said detecting step further comprising the steps:
  searching a global descriptor table to find a non-zero entry;
  comparing a segment size associated with the non-zero entry to a pre-determined segment size; and
  comparing one or more bits of each memory location in said segment with respect to pre-determined values;
modifying the page directory to point to one or more of page tables; and
creating page tables to map the memory address space to the desired address space.

2. The method of claim 1 wherein said step of detecting the presence of a page directory comprises the step of detecting the presence of memory manager software in use by the computer system.

3. The method of claim 2 wherein said step of detecting the presence of a page directory further comprises the step of detecting a processor type used in the computer system.

4. The method of claim 3 wherein said step of detecting the presence of a page directory further comprises the step of detecting the presence of an operating system mode used by the computer system.

5. The method of claim 1 wherein said step of detecting the presence of a page directory comprises the step of detecting an 386 class or 486 class processor, memory management software implementing page mode address, and the standard mode of WINDOWS being used by the computer system.

6. The method of claim 1 wherein said creating page tables step comprises the step of allocating an 8K address space and creating page table entries in a 4K address space starting at a page-aligned address in said 8K address space.

7. The method of claim 6 wherein said step of creating page tables step further comprises the step of setting remaining memory locations in said 4K address space to zero.

8. A method of allocating memory address space in a computer system to a frame buffer comprising the steps of:
  determining a desired memory space for the frame buffer responsive to the physical memory and the address limitations of the computer system;
  detecting the presence of a page directory which defines the upper limit of the computer system's memory address space to be below the a desired address space for locating the frame buffer;
  modifying the page directory to point to one or more page tables; and
  creating page tables to map the memory address space wherein said creating page tables step comprises the step of allocating an 8K address space and creating the page table entries in a 4K address space starting at a page aligned address in said 8K address space.

9. The method of claim 8 wherein said step of detecting the presence of a page directory comprises the step of detecting the presence of memory manager software in use by the computer system.

10. The method of claim 9 wherein said step of detecting the presence of a page directory further comprises the step of detecting a processor type used in the computer system.

11. The method of claim 10 wherein said step of detecting the presence of a page directory further comprises the step of detecting the presence of an operating system mode used by the computer system.

12. The method of claim 8 wherein said step of detecting the presence of a page directory comprises the step of detecting an 386 class or 486 class processor, memory management software implementing page mode address, and the standard mode of WINDOWS being used by the computer system.

13. The method of claim 1 wherein said detecting step comprises the steps of:
  searching a global descriptor table to find a non-zero entry;
  comparing a segment size associated with the non-zero entry to a predetermined segment size; and
  comparing one or more bits of each memory location in said segment with respective predetermined values.

14. The method of claim 13 wherein said step of creating page tables step further comprises the step of setting remaining memory locations in said 4K address space to zero.

15. A computer system comprising:
  a display;
  a video controller coupled to said display;
  a processor for executing a video control routine for:
    determining a desired memory space for the frame buffer responsive to the physical memory and the address limitations of the computer system;
    detecting the presence of a page directory which defines the upper limit of the computer system's memory address space to be below the a desired address space for locating the frame buffer, wherein said processor and detection detects said page directory by:
  searching a global descriptor table to find a non-zero entry;
  comparing a segment size associated with the non-zero entry to a predetermined segment size; and
  comparing one or more bits of each memory location in said segment with respective predetermined values.

16. The computer system of claim 15 wherein said processor detects the presence of a page directory by detecting the presence of memory manager software in use by the computer system.

17. The computer system of claim 16 wherein said processor detects the presence of a page directory further by detecting a processor type used in the computer system.

18. The computer system of claim 17 wherein said processor detects the presence of a page directory further by detecting the presence of an operating system mode used by the computer system.

19. The computer system of claim 15 wherein said processor detects the presence of a page directory further by detecting an 386 class or 486 class processor, memory management software implementing page mode address, and the standard mode of WINDOWS being used by the computer system.

20. The computer system of claim 15 wherein said processor creates page tables by allocating an 8K address space and creating page table entries in a 4K address space starting at a page-aligned address in said 8K address space.

21. The method of claim 20 wherein said processor creating page tables further by setting remaining memory locations in said 4K address space to zero.

22. A computer system comprising:
  a display;
  a video controller coupled to said display;
  a processor for executing a video control routine for:
    determining a desired memory space for the frame buffer responsive to the physical memory and the address limitations of the computer system;

detecting the presence of a page directory which defines the upper limit of the computer system's memory address space to be below the a desired address space for locating the frame buffer;

modifying the page directory to point to one or more page tables; and creating page tables to map the memory address space to the desired address space, wherein said processor creates page tables by allocating an 8K address space and creating page table entries in a 4K address space starting at a page-aligned address in said 8K address space, wherein said processor creates page tables by allocating an 8K address space and creating page table entries in a 4K address space starting at a page-aligned address in said 8K address space.

23. The computer system of claim 19 wherein said processor detects the presence of a page directory by detecting the presence of memory manager software in use by the computer system.

24. The computer system of claim 23 wherein said processor detects the presence of a page directory further by detecting a processor type used in the computer system.

25. The computer system of claim 24 wherein said processor detects the presence of a page directory further by detecting the presence of an operating environment mode used by the computer system.

26. The computer system of claim 23 wherein said processor detects the presence of a page directory further by detecting an 386 class or 486 class processor, memory management software implementing page mode address, and the standard mode of WINDOWS being used by the computer system.

27. The computer system of claim 23 wherein said processor detects said page directory by:

searching a global descriptor table to find a non-zero entry;

comparing a segment size associated with the non-zero entry to a predetermined segment size; and comparing one or more bits of each memory location in said segment with respective predetermined values.

28. The method of claim 27 wherein said processor creating page tables further by setting remaining memory locations in said 4K address space to zero.

29. Method of allocating memory address space in a computer system, which computer system is operating under a graphical user interface having a memory managed mode selected from either an enhanced mode or a standard mode, the standard mode being active, to a frame buffer comprising the steps of:

determining a desired memory space for the frame buffer responsive to the physical memory and the address limitations of the computer system;

detecting the presence of a page directory which defines the upper limit of the computer system's memory address space to be below the a desired address space for locating the frame buffer, said detecting step further comprising the steps of:

searching a globe descriptor table to find a non-zero entry;

comparing a segment size associated with the non-zero entry to a predetermined segment size; and comparing one or more bits of each memory locating in said segment with respective predetermined values;

modifying the page directory to point to one or more page tables; and creating page tables to map the memory address space to the desired address space.

30. The method of claim 29 wherein said step of detecting the presence of a page directory comprises the step of detecting the presence of memory manager software in use by the computer system.

31. The method of claim 30 wherein said step of detecting the presence of a page directory further comprises the step of detecting a processor type used in the computer system.

32. The method of claim 31 wherein said step of detecting the presence of a page directory further comprises the step of detecting the presence of an operating system mode used by the computer system.

33. The method of claim 29 wherein said step of detecting the presence of a page directory comprises the step of detecting a 386 class or 486 class processor, memory management software implementing page mode address, and the standard mode of WINDOWS being used by the computer system.

34. The method of claim 29 wherein said creating page tables step comprises the step of allocating an 8K address space and creating page table entries in a 4K address space starting at a page-aligned address in said 8K address space.

35. The method of claim 34 wherein said step of creating page tables step further comprises the step of setting remaining memory locations in said 4K address space to zero.

36. Method of allocating memory address space in a computer system, which computer system is operating under a graphical user interface having a memory managed mode selected from either an enhanced mode or a standard mode, the standard mode being active, to a frame buffer comprising the steps of:

determining a desired memory space for the frame buffer responsive to the physical memory and the address limitations of the computer system;

detecting the presence of a page directory which defines the upper limit of the computer system's memory address space to be below the a desired address space for locating the frame buffer;

modifying the page directory to point to one or more page tables; and creating page tables to map the memory address space to the desired address space, comprising the step of:

allocating an 8K address space and creating page table entries in a 4K address space starting at a page aligned address in said 8K address space.

37. The method of claim 36 wherein said step of detecting the presence of a page directory comprises the step of detecting the presence of memory manager software in use by the computer system.

38. The method of claim 37 wherein said step of detecting the presence of a page directory further comprises the step of detecting a processor type used in the computer system.

39. The method of claim 38 wherein said step of detecting the presence of a page directory further comprises the step of detecting the presence of an operating system mode used by the computer system.

40. The method of claim 36 wherein said step of detecting the presence of a page directory comprises the step of detecting a 386 class or 486 class processor, memory management software implementing page mode address, and the standard mode of WINDOWS being used by the computer system.

41. The method of claim 36 wherein said detecting step comprises the steps of:

searching a global descriptor table to find a non-zero entry;

comparing a segment size associated with the non-zero entry to a predetermined segment size; and comparing one or more bits of each memory location in said segment with respective predetermined values.

42. The method of claim 36 wherein said step of creating page tables step further comprises the step of setting remaining memory locations in said 4K address space to zero.

43. A computer system comprising:

a display;

a video controller coupled to said display;

a processor, which processor operates in a graphical user interface environment under a standard memory management mode, for executing a video control routine for:

determining a desired memory space for the frame buffer responsive to the physical memory and the address limitations of the computer system;

detecting the presence of a page directory which defines the upper limit of the computer system's memory address space to be below the desired address space for locating the frame buffer, wherein said processor detects said page directory by:

searching a global descriptor table to find a non-zero entry;

comparing a segment size associated with the non-zero entry to a predetermined segment size; and comparing one or more bits of each memory location in said segment with respective predetermined values;

modifying the page directory to point to one or more page tables; and creating page tables to map the memory address space to the desired address space.

44. The computer system of claim 43 wherein said processor detects the presence of a page directory by detecting the presence of memory manager software in use by the computer system.

45. The computer system of claim 44 wherein said processor detects the presence of a page directory further by detecting a processor type used in the computer system.

46. The computer system of claim 45 wherein said processor detects the presence of a page directory further by detecting the presence of an operating system mode used by the computer system.

47. The computer system of claim 43 wherein said processor detects the presence of a page directory further by detecting a 386 class or 486 class processor, memory management software implementing page mode address, and the standard mode of WINDOWS being used by the computer system.

48. The computer system of claim 43 wherein said processor creates page tables by allocating an 8K address space and creating page table entries in a 4K address space starting at a page-aligned address in said 8K address space.

49. The method of claim 48 wherein said processor creating page tables further by setting remaining memory locations in said 4K address space to zero.

50. A computer system comprising:

a display;

a video controller coupled to said display;

a processor, which processor operates in a graphical user interface environment under a standard memory management mode, for executing a video control routine for:

determining a desired memory space for the frame buffer responsive to the physical memory and the address limitations of the computer system;

detecting the presence of a page directory which defines the upper limit of the computer system's memory address space to be below the desired address space for locating the frame buffer, wherein said processor creates page tables by allocating an 8K address space and creating page table entries in a 4K address space starting at a page aligned address in said 8K address space;

modifying the page directory to point to one or more page tables; and creating page tables to map the memory address space to the desired address space.

51. The computer system of claim 50 wherein said processor detects the presence of a page directory by detecting the presence of memory manager software in use by the computer system.

52. The computer system of claim 51 wherein said processor detects the presence of a page directory further by detecting a processor type used in the computer system.

53. The computer system of claim 52 wherein said processor detects the presence of a page directory further by detecting the presence of an operating system mode used by the computer system.

54. The computer system of claim 50 wherein said processor detects the presence of a page directory further by detecting a 386 class or 486 class processor, memory management software implementing page mode address, and the standard mode of WINDOWS being used by the computer system.

55. The computer system of claim 50 wherein said processor detects said page directory by:

searching a global descriptor table to find a non-zero entry;

comparing a segment size associated with the non-zero entry to a predetermined segment size; and comparing one or more bits of each memory location in said segment with respective predetermined values.

56. The method of claim 50 wherein said processor creating page tables further by setting remaining memory locations in said 4K address space to zero.

* * * * *

UNITED STATES PATENT AND TRADEMARK OFFICE
CERTIFICATE OF CORRECTION

PATENT NO. : 5,664,139
DATED : September 2, 1997
INVENTOR(S) : Randolph W. Spurlock It is certified that error appears in the above-identified patent and that said Letters Patent is hereby corrected as shown below:

Col. 7, ln. 27, delete "detecting an 386", insert -- detecting a 386 --.

Col. 7, ln. 45, delete "below the a desired", insert -- below the desired --.

Col. 8, ln. 1, delete "detecting an 386", insert -- detecting a 386 --.

Col. 8, ln. 26, delete "below the a desired", insert -- below the desired --.

Col. 8, ln. 49, delete "detecting an 386", insert -- detecting a 386 --.

Col. 9, ln. 3, delete "below the a desired", insert -- below the desired --.

Col. 9, ln. 15, delete "of claim 19", insert -- of claim 22 --.

Col. 9, ln. 26, delete "of claim 23", insert -- of claim 22 --.

Col. 9, ln. 28, delete "detecting an 386", insert -- detecting a 386 --.

Col. 9, ln. 32, delete "of claim 23", insert -- of claim 22 --.

Col. 9, ln. 54, delete "below the a desired", insert -- below the desired --.

Col. 10, ln. 36, delete "below the a desired", insert -- below the desired --.

Signed and Sealed this

Sixteenth Day of December, 1997

*Attest:*

BRUCE LEHMAN

*Attesting Officer*   *Commissioner of Patents and Trademarks*